United States Patent [19]

Hatori et al.

[11] Patent Number: 4,961,632

[45] Date of Patent: Oct. 9, 1990

[54] LIGHT BEAM DEFLECTOR/MODULATOR

[75] Inventors: Masami Hatori; Nobuharu Nozaki, both of Kanagawa, Japan

[73] Assignee: Fuji Photo Film Co., Ltd., Kanagawa, Japan

[21] Appl. No.: 288,837

[22] Filed: Dec. 23, 1988

[30] Foreign Application Priority Data

Dec. 29, 1987 [JP] Japan .................. 62-335501
Dec. 29, 1987 [JP] Japan .................. 62-335502

[51] Int. Cl.⁵ .................. G02F 1/11; G02F 1/33
[52] U.S. Cl. .................. 350/358; 350/96.13
[58] Field of Search .................. 350/358, 96.13

[56] References Cited

U.S. PATENT DOCUMENTS

| | | | |
|---|---|---|---|
| 3,736,045 | 5/1973 | Heidrich et al. | 350/358 |
| 4,006,967 | 2/1977 | Kenan et al. | 350/358 |
| 4,370,030 | 1/1983 | Sprague | 350/358 |
| 4,491,384 | 1/1985 | Yamashita et al. | 350/358 X |
| 4,565,983 | 1/1986 | Gratze | 350/358 X |
| 4,604,707 | 8/1986 | Yamashita et al. | 350/358 X |
| 4,778,991 | 10/1988 | Nozaki et al. | 350/358 X |

FOREIGN PATENT DOCUMENTS 62-244024 10/1987 Japan .
63-197924 8/1988 Japan .

Primary Examiner—Eugene R. LaRoche
Assistant Examiner—Michael B. Shingleton
Attorney, Agent, or Firm—Sughrue, Mion, Zinn, Macpeak & Seas

[57] ABSTRACT

A waveguide-type light deflector or modulator includes an optical waveguide for guiding a light beam therethrough along a light path, and an interdigital transducer for generating surface elastic waves in the optical waveguide to diffract the light beam and for propagating the surface elastic waves in opposite directions across the light path, the interdigital transducer being transversely disposed to the light path in a substantially central position in the light path. In the light deflector, an alternating voltage with a continuously varying frequency is applied to the interdigital transducer to enable the surface elastic waves to continuously diffract and deflect the light beam. In the light modulator, the application of an alternating voltage to the interdigital transducer is controlled to vary the diffraction efficiency of the light beam, thereby to modulate the light beam.

6 Claims, 3 Drawing Sheets

LIGHT BEAM DEFLECTOR/MODULATOR

BACKGROUND OF THE INVENTION

1. Field of the Invention

The present invention relates to a light deflector, and more particularly to a waveguide-type light deflector for deflecting a light beam that has been guided through an optical waveguide through diffraction caused by a surface elastic wave and for issuing the deflected light beam out of the optical waveguide.

The present invention is also concerned with a waveguide-type light deflector for diffracting a light beam that has been guided through an optical waveguide, with a surface elastic wave propagated in the optical waveguide, and for controlling the energy intensity of the surface elastic wave to vary the diffraction efficiency, thereby to modulate the light beam.

2. Description of the Prior Art

Light scanning recording apparatuses or light scanning reading apparatuses, for example, employ light deflectors for deflecting a light beam. Such light deflectors include mechanical light deflectors, such as galvanometer mirrors or polygon mirrors, electrooptic deflectors (EODs), and acoustooptic deflectors (AODs). Mechanical light deflectors are problematic in that they have poor durability and a large size. EODs and AODs are disadvantageous in that they have long light beam paths since the angle at which they deflect light cannot be large, and hence light scanning recording or reading apparatuses incorporating them are large in size.

One light deflector which has recently been proposed to solve the above drawbacks employs a light waveguide. The proposed light deflector has a slab-shaped light waveguide made of a material capable of propagating a surface elastic wave and means in the optical waveguide for generating a surface elastic wave which travels across a light beam guided in the optical waveguide, the surface elastic wave having a continuously variable frequency. The means for generating a surface elastic wave comprises, for example, an interdigital transducer (IDT), and a driver for applying an alternating voltage with a continuously variable frequency to the interdigital transducer. In this light deflector, since the light beam guided in the optical waveguide undergoes Bragg diffraction due to an acoustooptic interaction between the light beam and the surface elastic wave, and also since the angle of diffraction is variable and depends on the frequency of the surface elastic wave, the light beam can be continuously deflected in the optical waveguide by varying the frequency of the surface elastic wave. A light deflector of this type is described in detail in U.S. Pat. No. 4,778,991, for example.

As described above, a waveguide-type light deflector generally employs an IDT as a means for generating a surface elastic wave. The IDT is disposed to the side of the path over which light beams guided through the optical waveguide travel so that the IDT will not directly interfere with the light beams.

A waveguide-type light deflector of the above design is required to increase the width of a light beam guided through the optical waveguide as much as possible. More specifically, where a deflected light beam issued from the optical waveguide is used to scan a recording medium, for example, to record a desired image thereon, the width of the light beam must be increased while being guided through the optical waveguide and then be converged into a light beam spot in order to increase the resolution of the recorded image.

If the light beam guided through the optical waveguide has an increased width, however, the surface elastic wave generated from the IDT, located as described above, has to traverse an increased distance in order to cross the light beam, during which time the surface elastic wave is greatly attenuated by being absorbed by the optical waveguide. The energy intensity I of the surface elastic wave as it is propagated in the optical waveguide is expressed by the following equation:

$$I = I_o e^{-\alpha x} \dots (1) \text{ TM}$$

where $I_o$ is the energy intensity of the surface elastic wave when it is generated by the IDT, $\alpha$ is the coefficient of ultrasonic absorption by the optical waveguide, and x is the distance from the IDT. Equation (1) indicates that the surface elastic wave intensity I is exponentially attenuated as the distance x increases [see FIG. 3(a)]. The efficiency $\eta$ of diffraction of the light beam by the surface elastic wave is given as follows:

$$\eta = \sin^2 A \sqrt{I}$$

where A is a coefficient. The diffraction efficiency $\eta$ is lowered as the surface elastic wave intensity I is lowered. Accordingly, the diffraction efficiency $\eta$ is greatly reduced as the distance x from the IDT increases. If the intensity of the light beam before it is diffracted by the surface elastic wave has a Gaussian distribution as indicated by the solid-line curve in FIG. 3(b), then the diffracted light beam has an intensity distribution as indicated by the dotted-line curve in FIG. 3(b). More specifically, since the surface elastic wave is largely attenuated before it reaches a central position across the width of the light beam, where the light beam intensity P is maximum at Po, the intensity across the entire width of the diffracted light beam is considerably reduced. Further, the intensity distribution of the diffracted light beam becomes quite different from the Gaussian distribution which the light beam exhibited before being diffracted, so that difficulty will be experienced in sufficiently converging the diffracted light beam.

There is also known a waveguide-type light modulator, which similarly to the above waveguide-type light deflector, has a slab-shaped light waveguide and means in the optical waveguide for generating a surface elastic wave which travels across a light beam guided in the optical waveguide. In this light modulator, since the light beam guided in the optical waveguide undergoes Bragg diffraction due to an acoustooptic interaction between the light beam and the diffraction is variable and depends on the energy intensity of the surface elastic wave, the light beam can be modulated by controlling the energy intensity of the surface elastic wave.

The waveguide-type light modulator also employs an IDT as a means for generating a surface elastic wave. The surface elastic wave intensity can be controlled by continuously controlling the level of an alternating voltage applied to the IDT or by turning on and off such an alternating voltage applied to the IDT. The IDT is disposed to the side of the path over which light beams guided through the optical waveguide travel so that the IDT will not directly interfere with the light beams.

The waveguide-type light modulator of the foregoing arrangement is also required to increase the width of the light beam guided through the optical waveguide as much as possible in order to increase the resolution of a recorded image. Efforts to meet this requirement, however, result in the same problems as those described above with respect to the waveguide-type light deflector. More specifically, the intensity of the diffracted light beam is reduced to a large extent, and the intensity distribution of the diffracted light beam is widely different from a Gaussian distribution, making it difficult to sufficiently converge the light beam.

If the light beam guided through the optical waveguide has an increased width, then the period of time required for the surface elastic wave to travel across the guided light beam is increased, and hence it becomes impossible to achieve a sufficient modulation rate.

SUMMARY OF THE INVENTION

It is an object of the present invention to provide a waveguide-type light deflector or a waveguide-type light modulator which will eliminate the aforesaid drawbacks while employing an IDT as a means for generating a surface elastic wave.

A waveguide-type light deflector or a waveguide-type light modulator according to the present invention includes an IDT for generating a surface elastic wave in an optical waveguide, the IDT being transversely disposed in the optical waveguide in a substantially central position in the path of the light beam which is guided in the optical waveguide.

With the IDT thus positioned, the surface elastic wave generated by the IDT is propagated in two opposite directions from a substantially central area across the guided light beam toward laterally opposite sides of the guided light beam. The distance which is traversed by each of the surface elastic waves propagated respectively in opposite directions is about ½ of the distance which would otherwise be traversed by a single surface elastic wave traveling from one side to the other of the guided light beam in a conventional waveguide-type light deflector or modulator. Therefore, the magnitude of attenuation by the optical waveguide of each of the surface elastic waves propagated in the opposite directions across the guided light beam is lower than it would be in conventional waveguide-type light deflectors or modulators.

The period of time required for the surface elastic waves to travel from the central area in opposite directions across the guided light beam is also about ½ of the period of time which would be required in the conventional waveguide-type light deflectors or modulators.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
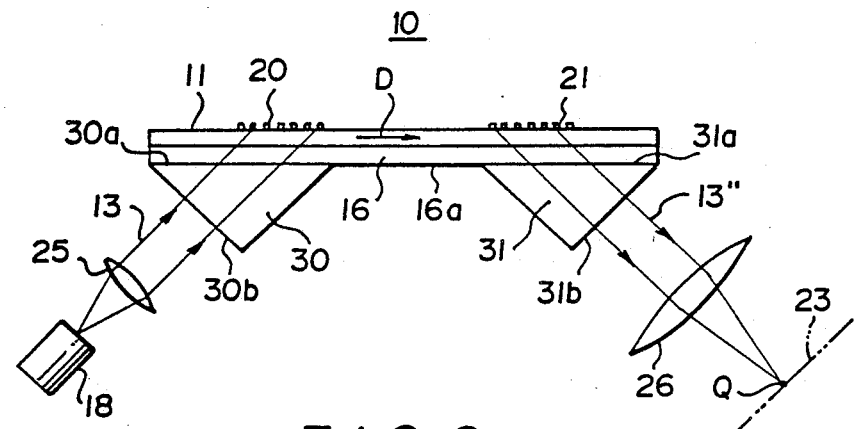
FIGS. 1 and 2 are side elevational and perspective views, respectively, of a waveguide-type light deflector according to a first embodiment of the present invention.
Figure 2:
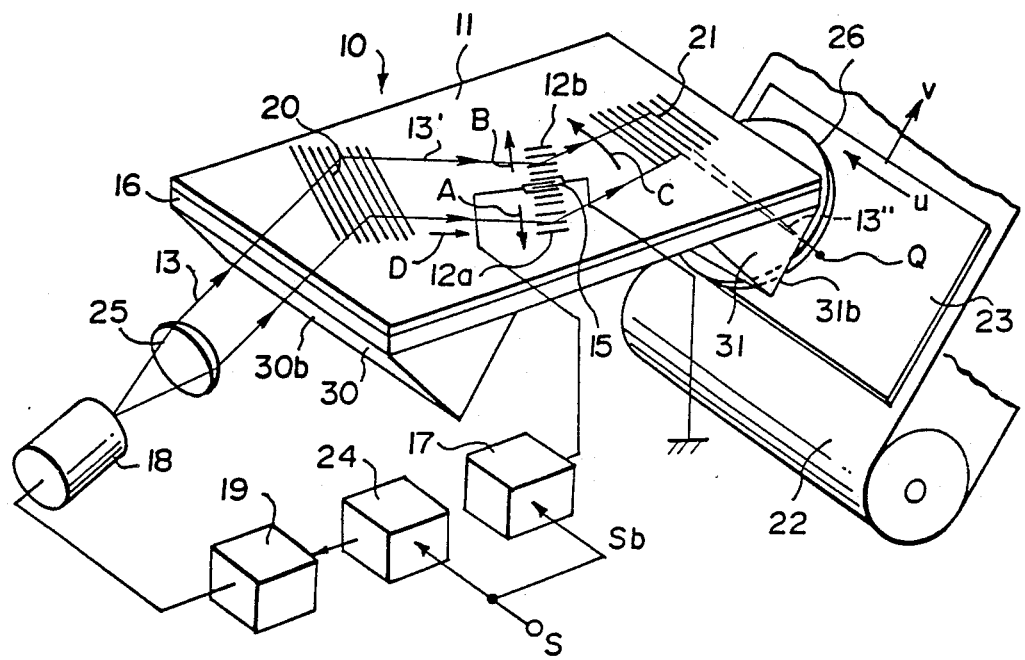
Figure 3A:
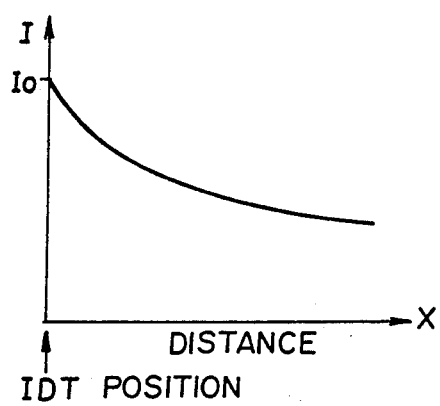
FIGS. 3(a) and 3(b) are graphs showing an attenuation curve of a surface elastic wave and intensity distributions of a guided light beam before and after it is diffracted in a conventional waveguide-type light deflector or modulator.

FIGS. 1 and 2 illustrate a waveguide-type light deflector 10 according to a first embodiment of the present invention. The light deflector 10 which may be incorporated in a light scanning recording apparatus, for example, comprises a slab-shaped optical waveguide 11 on a transparent substrate 16, an interdigital transducer (IDT) 15 disposed in the center of the optical waveguide 11, a linear grating coupler (LGC) 20 for introducing light into the waveguide and a linear grating coupler 21 for emitting light from the waveguide, which are disposed on the surface of the optical waveguide 11 somewhat spaced apart from each other. The light deflector 10 also has a light-introducing prism 30 and a light-emitting prism 31 on the surface 16a of the substrate 16 which are not in contact with the optical waveguide 11. The light-introducing prism 30 has a triangular cross section, a first light-passing surface 30a and a second light-passing surface 30b. The prism 30 is securely fixed to the substate surface 16b by pressing the first light-passing surface 30a firmly against the substrate surface 16a with an adhesive of a high refractive index interposed therebetween. The light-emitting prism 31 which is identical in shape to the light-introducing prism 30 also has a first light-passing surface 31a and a second light-passing surface 31b, and is fixed to the substrate surface 16a in the same manner as the light-introducing prism 30.

In the first embodiment, the substrate 16 is in the form of a wafer of $LiNbO_3$, for example, and the optical waveguide 11 is formed by providing a Ti-diffused film, for example, on the surface of the wafer. However, the substrate 16 may be a crystalline substrate of sapphire, Si, or the like, and the optical waveguide 11 may comprise a film of any other suitable materials formed by sputtering, evaporation, or the like. Optical waveguides are described in detail in *Integrated Optics* edited by T. Tamir, Topics in Applied Physics, Vo. 7, published by Springer-Verlag, 1975, and *Optical Integrated Circuits* written by Nishihara, Haruna, and Suhara, and published by Ohm Co., 1985. The optical waveguide of the present invention may be any of the known optical waveguides. However, the optical waveguide 11 should be made of a material such as diffused Ti capable of propagating a surface elastic wave. The optical waveguide 11 may be of a laminated structure of two or more films or layers.

A semiconductor laser 18 for generating a recording light beam (laser beam) 13 is disposed to direct the light beam 13 perpendicularly toward the second light-passing surface 30b of the light-introducing prism 30. The light beam 13 which is divergent in nature is converted by a collimator lens 25 into a parallel-ray beam that enters the light-introducing prism 30 through the second light-passing surface 30b. The light beam 13 then enters the substrate 16 through the first light-passing surface 30a, passes through the substrate 16, and is then applied to the LGC 20. The light beam 13 is diffracted by the LGC 20 to enter the optical waveguide 11 in which the light beam travels in the direction of arrow D as a guided wave 13' in a guided mode.

In order to increase the resolution of a recorded image, the guided wave 13' has a substantially large width d (see FIG. 5) which ranges from 10 to 15 mm. The IDT 15 comprises a number of electrode fingers having slightly different widths, with distances between the electrode fingers being varied according to the different finger widths. The electrode fingers are arrayed parallel to each other in a vertical direction (FIG. 5), and this electrode finger array has a length (in the vertical direction in FIG. 5) of 600 $\mu$m, for example. The IDT 15 is tranversely disposed in a substantially central position in the path of the guided wave 13'.

For recording an image, a photosensitive member 23 is set on a feed means 22 such as an endless belt or the like. The semiconductor laser 18 is energized by a laser driver 19 to emit the laser beam 13. At the same time, an alternating voltage with a continuously varying frequency is applied to the IDT 15 by a driver 17. The laser driver 19 is controlled by a modulating circuit 24 to energize the semiconductor laser 18 so that the beam output of the semiconductor laser 18 will be varied according to an applied image signal S (i.e., the intensity of the laser beam 13 will be varied or the number of pulses or the duration of pulses will be varied if the laser beam 13 is emitted as pulses).

Figure 5:
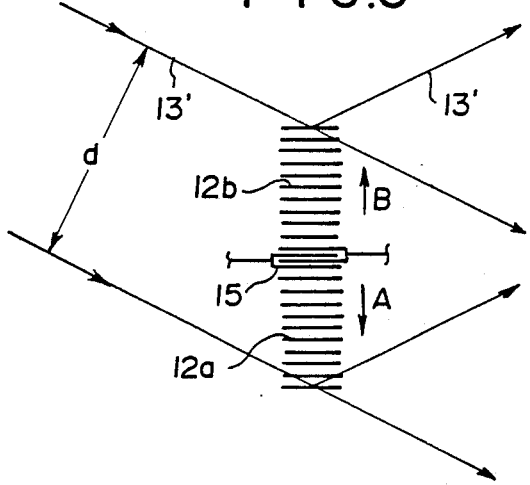
FIG. 5 is an enlarged plan view of a region of the light deflector of the invention where an IDT is disposed.

By thus applying the alternating voltage to the IDT 15, surface elastic waves 12a and 12b travel along the surface of the optical waveguide 11 in opposite directions as indicated by arrows A and B in FIGS. 2 and 5. The IDT 15 is arranged so that the surface elastic waves 12a and 12b cross the path of the guided wave (parallel-ray beam) 13'. Therefore, the guided wave 13' travels across the surface elastic waves 12a and 12b, and undergoes Bragg diffraction due to an acoustooptic interaction between the guided wave 13' and the surface elastic waves 12a and 12b.

The Bragg diffraction of the guided wave 13' by the surface elastic waves 12a and 12b will be described briefly below, though it is a known phenomenon in the art. Assuming that the angle (Bragg angle) formed between the directions in which the surface elastic waves 12a and 12b propagated in the optical waveguide 11 travel and the direction in which the guided wave 13' travels is equal to $\theta$, then the angle of deflection (the angle of diffraction) $\delta$ of the guided wave 13' due to an acoustooptic interaction with the surface elastic waves 12a and 12b is $\delta = 2\theta$, which is expressed as follows:

$$2\theta = 2\sin^{-1}[\lambda/(2Ne \cdot \Lambda)]$$
$$= \lambda/(Ne \cdot \Lambda)$$
$$= \lambda \cdot f/(Ne \cdot v)$$

where $\lambda$ is the wavelength of the guided wave 13', Ne is the effective refractive index of the optical waveguide 11 with respect to the guided wave 13', and $\Lambda$, f, and v are the wavelength, frequency, and speed, respectively, of the surface elastic waves 12a and 12b. Therefore, $2\theta$ or $\delta$ is approximately proportional to the frequency f of the surface elastic waves 12a and 12b. Since the driver 17 applies the alternating voltage having a continuously varying frequency to the IDT 15, the frequency of the surface elastic waves 12a and 12b is continuously varied, which in turn continuously varies the angle of deflection. Therefore, the guided wave 13' is diffracted and deflected so as to continuously vary the angle of diffraction, indicated by arrow C in FIG. 2. The deflected guided wave 13' is then diffracted by the LGC 21 and emitted from the optical waveguide 11 into the substrate 16, and then emitted from the substrate 16 as an external light beam 13". The light beam 13" is passed through the first light-passing surface 31a of the light-emitting prism 31 into the prism 31, from which the light beam 13" is emitted by passing perpendicularly through the second light-passing surface 31b.

The light beam 13" thus emitted out of the optical waveguide device 10 passes through a scanning lens 26 such as an f$\theta$ lens, and is converted thereby into a small beam spot Q, which then scans the photosensitive member 23 in the main scanning direction indicated by arrow u. At the same time, the photosensitive member 23 is fed by feed means 22 in an auxiliary scanning direction, shown by arrow v, that is substantially normal to the main scanning direction. Accordingly, the photosensitive member 23 is two-dimensionally scanned by the light beam 13". Since the light beam 13" is modulated by the modulating circuit 24 based on the image signal S, the light beam 13" records an image represented by the image signal S on the photosensitive member 23.

In order to synchronize the appropriate parts of the image signal S with the main scanning operation of the light beam 13", a blanking signal Sb contained in the image signal S is employed as a trigger signal to control the timing for applying the voltage to the IDT 15. The main scanning operation and the auxiliary scanning operation can be synchronized by also controlling the timing for driving the feed means 22 with the blanking signal Sb.

Figure 4A:
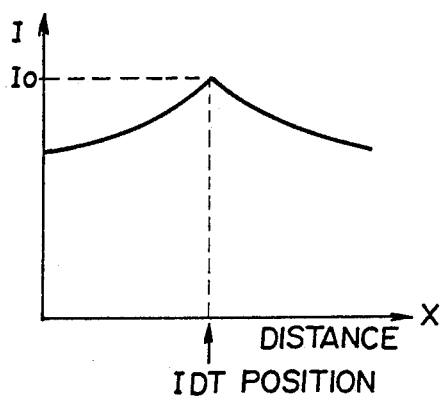
FIGS. 4(a) and 4(b) are graphs showing an attenuation curve of a surface elastic wave and intensity distributions of a guided light beam before and after it is diffracted in a waveguide-type light deflector or modulator according to the present invention.
Figure 3B:
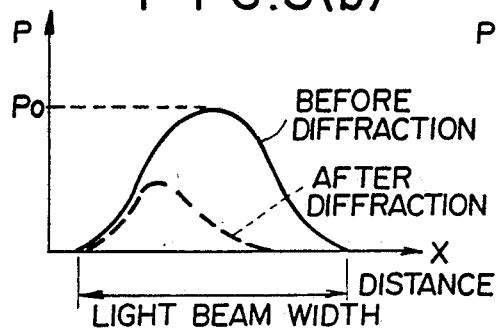

According to the present invention, the IDT 15 is disposed in a substantially central position transversely in the path of the guided wave 13', as described above. The distance traversed by each of the surface elastic waves 12a and 12b propagated from the IDT 15 in opposite directions is about ½ of the distance which would be traversed by a single surface elastic wave propagated from one side edge to the other of the guided wave in a conventional waveguide-type light deflector. The surface elastic waves 12a and 12b are attenuated as indicated by the curve shown in FIG. 4(a). As each of the surface elastic waves 12a and 12b travels a shorter distance across the guided wave 13' than the distance which would be traversed by a single surface elastic wave propagated from a position outside of the path of the guided wave, the absorption by the optical waveguide 11 of the surface elastic waves 12a and 12b is correspondingly smaller. Therefore, the magnitude of attenuation of the surface elastic waves 12a and 12b in the region where they cross the guided wave 13' is lowered. Since the energy intensity I of the surface elastic waves 12a and 12b is maximum at the center of the width of the guided wave 13', if the intensity of the guided wave 13' before it is diffracted has a Gaussian distribution as indicated by the solid-line curve in FIG. 4(b), the diffraction efficiency $\eta$ is maximized in the area where the intensity of the guided wave is maximum. Therefore, after it has been diffracted the intensity of the guided wave 13' is not substantially attenuated in the central high-intensity area of the light beam width, as indicated by the intensity distribution shown by the dotted-line curve in FIG. 4(b), and hence the overall intensity of the diffracted guided wave 13' remains sufficiently high.

A specific numerical example of the attenuation of the guided wave 13' will be described below. If $\alpha$, the coefficient of ultrasonic absorption given in equation (1), is 3.0 dB when the surface elastic wave frequency is f=1.0 GHz and the width d of the guided wave 13' is 10 mm, then each of the surface elastic waves 12a and 12b generated by the IDT 15 with an intensity of Io has an intensity of 0.7 Io at the side edge of the guided wave 13'. If the surface elastic wave was propagated under the same conditions from a position on one side edge of the guided wave 13' into the guided wave 13', then the intensity I of the surface elastic wave would be reduced to 0.5 Io after completely crossing the guided wave 13'.

Figure 4B:
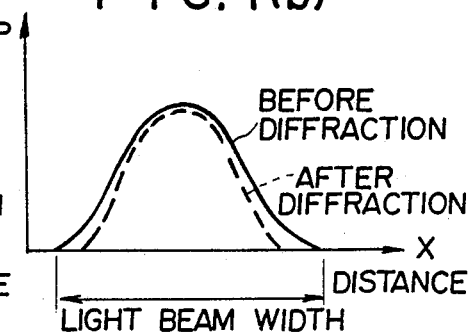

As shown in FIG. 4(b), after the guided wave 13' has been diffracted, the intensity of the guided wave 13' has a substantially Gaussian distribution similar to the Gaussian intensity distribution which the guided wave 13' had before being diffracted. Therefore, it is possible to converge the light beam 13" emitted from the optical waveguide 11 into a sufficiently small beam spot Q with the scanning lens 26.

Figure 6:
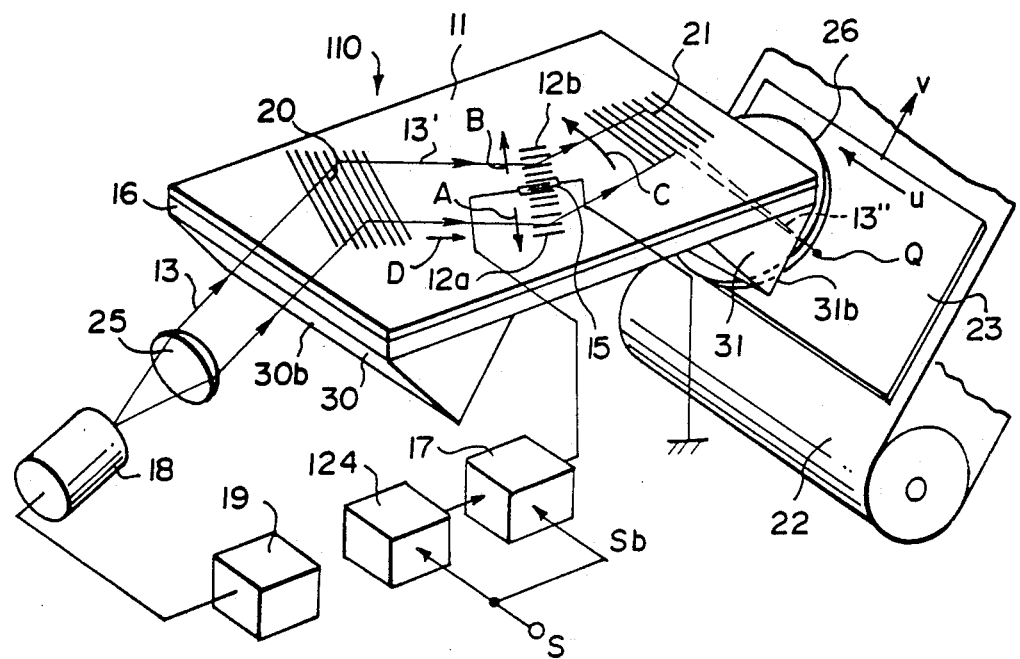
FIG. 6 is a perspective view of a waveguide-type light modulator according to a second embodiment of the present invention.

A waveguide-type light modulator 110 according to a second embodiment of the present invention will be described below with reference to FIG. 6. Those parts in FIG. 6 which are identical to those of FIG. 2 are denoted by identical reference numerals, and will not be described in detail below.

The light modulator 110 can also deflect a light beam, and may be incorporated in a light scanning recording apparatus, for example. The light modulator 110 differs from the light deflector 10 of the first embodiment in that the driver 17 is controlled by a modulating circuit 124 to either vary the level of an alternating voltage or to turn on or off an alternating voltage applied to the IDT 15, depending on the image signal S applied to the modulating circuit 124.

The light modulator 110 offers the same advantages as those of the light deflector 10 described above. Specifically, after it has been diffracted the intensity of the guided wave 13' is not substantially attenuated in the central high-intensity area of the light beam width, as indicated by the intensity distribution shown by the dotted-line curve in FIG. 4(b), and hence the overall intensity of the diffracted guided wave 13' remains sufficiently high. Additionally, the intensity of the diffracted guided wave 13' has a substantially Gaussian distribution similar to the Gaussian intensity distribution which the guided wave 13' had before being diffracted, making it possible to converge the light beam 13" emitted from the optical waveguide 11 into a sufficiently small beam spot Q with the scanning lens 26.

The period of time required for each of the surface elastic waves 12a and 12b to travel completely across the guided wave 13' is about ½ of the time period which would be required for a surface elastic wave generated from a position outside of the guided wave to be propagated fully across the guided wave. Consequently, the time period required for the intensity of the diffracted guided wave 13' to respond to a change in the level or the on/off state of the alternating voltage applied to the IDT 15 is shortened, and hence the rate of modulation of the guided wave 13' can be made sufficiently high. In the absence of any other limiting conditions, the modulation rate which is possible with the arrangement of FIG. 6 is about 2 times the modulation rate possible when propagating the surface elastic wave from a position to the side of the path traveled by the guided wave. For example, if the speed v of the surface elastic waves 12a and 12b is 3463 m/sec, and the width d of the guided wave 13' is 10 mm (=10$^{-2}$m), then the period of time required for each of the surface elastic waves 12a and 12b to travel completely across the guided wave 13' is:

$$10^{-2}/(3462 \times 2) = 1.45 \times 10^{-6} \text{ sec}$$

. The light modulator 110 is also capable of deflecting a light beam, as described above. However, if the frequency of the alternating voltage applied to the IDT 15 is not varied, then the angle of diffraction of the guided wave 13' at the surface elastic waves 12a and 12b is constant, and the light modulator 110 only modulates a light beam applied thereto.

In the waveguide-type light deflector or modulator according to the present invention, as described above, the IDT 15 for generating surface elastic waves 12a and 12b is disposed substantially centrally with respect to the width of a guided wave 13' for reducing the attenuation of the surface elastic waves 12a and 12b which is caused as the surface elastic waves 12a and 12b cross the guided wave 13'. Therefore, the light deflector 10 or light modulator 110 of the invention utilizes a sufficiently high degree of the light and allows the width d of the guided wave 13' propagated through the optical waveguide 11 to be increased. Particularly in the light deflector 10, it becomes possible to increase the frequency of the surface elastic waves 12a and 12b into a relatively high frequency range in which the surface elastic waves 12a and 12b tend to be absorbed by the optical waveguide 11, so that the resolution of a recorded image can be increased in the light scanning recording process.

With the IDT 15 being positioned in the light deflector 10 and the light modulator 110 as described above, when the intensity of a guided wave before it is diffracted has a Gaussian distribution, the intensity of the guided wave after it is diffracted also has a Gaussian distribution. Therefore, it is possible to converge the light beam 13" emitted from the optical waveguide 11 into a sufficiently small beam spot to achieve highly accurate scanning of the photosensitive member 23.

The IDT 15 positioned as described above in the light modulator 110 serves to shorten the period of time required for each of the surface elastic waves 12a and 12b to travel across the guided wave 13', thus increasing the modulation rate to a sufficient level.

Although certain preferred embodiments have been shown and described, it should be understood that many changes and modifications may be made therein without departing from the scope of the appended claims.

We claim:

1. A waveguide-type light deflector for deflecting a light beam, comprising:
   (i) an optical waveguide for guiding a light beam therethrough along a light path;
   (ii) a first coupler, disposed on said optical waveguide, for introducing light into said optical waveguide;

(iii) a second coupler, disposed on said optical waveguide for emitting said light from said optical waveguide;

(iv) an interdigital transducer, disposed between said first and second couplers, for generating surface elastic waves in said optical waveguide to diffract said light beam and for propagating the surface elastic waves in opposite directions across said light path, said interdigital transducer being transversely disposed to said light path in a substantially central position in said light path; and (v) means for applying an alternating voltage with a continuously varying frequency to said interdigital transducer to enable said surface elastic waves to continuously diffract and deflect said light beam.

2. A waveguide-type light modulator for modulating a light beam, comprising:

(i) an optical waveguide for guiding a light beam therethrough along a light path:

(ii) a first coupler, disposed on said optical waveguide, for introducing light into said optical waveguide;

(iii) a second coupler, disposed on said optical waveguide, for emitting said light from said optical waveguide;

(iv) an interdigital transducer, disposed between said first and second optical waveguides, for generating surface elastic waves in said optical waveguide to diffract said light beam and for propagating the surface elastic waves in opposite directions across said light path, said interdigital transducer being transversely disposed to said light path in a substantially central position in said light path; and (v) means for controlling the application of an alternating voltage to said interdigital transducer to vary the diffraction efficiency of said light beam, thereby to modulate the light beam.

3. A waveguide-type light modulator for modulating a light beam as defined in claim 1, wherein said interdigital transducer comprises an array of parallel electrodes, having differing widths, which are differing distances apart from each other.

4. A waveguide-type light modulator for modulating a light beam as defined in claim 2, wherein said interdigital transducer comprises an array of parallel electrodes having differing widths, which are differing distances apart from each other.

5. A waveguide-type light modulator for modulating a light beam as defined in claim 1, wherein said optical waveguide comprises a diffused titanium film.

6. A waveguide-type light modulator for modulating a light beam as defined in claim 2, wherein said optical waveguide comprises a diffused titanium film.

* * * * *